United States Patent
Hisada et al.

(10) Patent No.: US 10,843,293 B2
(45) Date of Patent: Nov. 24, 2020

(54) LASER WELDING METHOD

(71) Applicant: TOYOTA JIDOSHA KABUSHIKI KAISHA, Toyota (JP)

(72) Inventors: Kohei Hisada, Nagoya (JP); Toru Hioki, Miyoshi (JP); Kazuyuki Ogusu, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 285 days.

(21) Appl. No.: 15/000,781

(22) Filed: Jan. 19, 2016

(65) Prior Publication Data
US 2016/0236297 A1    Aug. 18, 2016

(30) Foreign Application Priority Data
Feb. 18, 2015    (JP) ................... 2015-029629

(51) Int. Cl.
*B23K 26/082*    (2014.01)
*B23K 26/60*    (2014.01)
*B23K 26/26*    (2014.01)

(52) U.S. Cl.
CPC ............ *B23K 26/082* (2015.10); *B23K 26/26* (2013.01); *B23K 26/60* (2015.10)

(58) Field of Classification Search
CPC .............. B23K 26/246; B23K 2203/04; B23K 26/3206
USPC ................ 219/121.64, 161, 121.63; 228/175
See application file for complete search history.

(56) References Cited

U.S. PATENT DOCUMENTS

| 7,312,417 B2 * | 12/2007 | Becker ................... B23K 26/10 |
| | | 219/121.64 |
| 9,625,713 B2 * | 4/2017 | Helie ................. B23K 26/0665 |
| 2011/0200802 A1 | 8/2011 | Li et al. |

FOREIGN PATENT DOCUMENTS

| EP | 1 013 372 A1 | 6/2000 | |
| JP | H0890266 | * 4/1996 | ............ B23K 26/00 |
| JP | 2006-007238 A | 1/2006 | |
| JP | 2009-277593 A | 11/2009 | |

OTHER PUBLICATIONS

Translation of JPH0890266, Aug. 2017.*

* cited by examiner

*Primary Examiner* — Tu B Hoang
*Assistant Examiner* — Thomas J Ward
(74) *Attorney, Agent, or Firm* — Sughrue Mion, PLLC

(57) ABSTRACT

A laser welding method for welding a plurality of objects to be welded by applying a laser beam scanned by a scanning unit to the plurality of objects to be welded while moving the scanning unit in a welding direction along a welding path, the laser welding method including the steps of: performing a step of preliminary-fixation-welding on a predetermined place in the welding direction of the objects to be welded, and a step of main-welding on a place corresponding to the preliminarily-fixed place of the object to be welded within a scanning range of the scanning unit while moving the scanning unit. Further, when the place corresponding to the preliminarily-fixed place of the object to be welded is main-welded, the place is main-welded in a state where both sides of the place to be main-welded are restrained.

7 Claims, 9 Drawing Sheets

LASER WELDING METHOD

INCORPORATION BY REFERENCE

This application is based upon and claims the benefit of priority from Japanese patent application No. 2015-029629, filed on Feb. 18, 2015, the disclosure of which is incorporated by reference herein in its entirety.

BACKGROUND

1. Field

The present disclosure relates to a laser welding method.

2. Description of Related Art

Remote welding may be performed by scanning (i.e., directing in various directions in an orderly manner) a laser beam guided from a laser oscillator by using a scanning unit and applying the scanned (i.e., directed) laser beam to an object(s) to be welded.

Japanese Unexamined Patent Application Publication No. 2006-007238 discloses a technique relating to remote welding. In the technique disclosed in Japanese Unexamined Patent Application Publication No. 2006-007238, a plurality of objects to be welded are preliminarily-fixed before they are laser-welded. This can prevent the positions of the plurality of objects to be welded from being deviated when they are laser-welded.

SUMMARY

In remote welding in which an object(s) to be welded is welded by applying a laser beam scanned (i.e., directed) by a scanning unit to the object(s) to be welded, when the object(s) to be welded (such as the body of an automobile) is larger than the scanning range of the laser beam, the entire range of the object(s) to be welded cannot be welded just by scanning (i.e., directing in various directions in an orderly manner) the laser beam by the scanning unit. In such a case, it may be necessary to perform welding while moving the scanning unit by using a robot.

Incidentally, when the object(s) to be welded is a plurality of metal plates, there are cases where the objects to be welded are deformed by a thermal distortion, a residual stress, or the like that occurs when the objects to be welded are welded, thus causing defective welding. To prevent the occurrence of such defective welding, it may be necessary to perform preliminary-fixation welding (i.e., welding for preliminary fixation) before performing the main welding.

However, in the case where the main welding is performed for the objects to be welded after performing the preliminary-fixation welding, it is necessary to perform the preliminary-fixation welding while moving the scanning unit by using the robot (see FIG. 11(a)), and then perform the main welding while moving the scanning unit by using the robot again (see FIG. 11(b)). That is, in this case, the scanning unit needs to be moved on the same welding route twice in total. Further, the moving operation of the scanning unit performed by the robot is slower than the scanning operation of the laser beam performed by the scanning unit. Therefore, because the scanning unit moves on the same route twice in total when the objects to be welded are welded, the number of steps necessary for the welding increases.

In view of the above-described techniques and procedures, an object of the present disclosure is to provide a laser welding method capable of reducing the number of steps necessary for welding an object to be welded while preventing the occurrence of defective welding.

A first exemplary aspect of the present disclosure is a laser welding method for welding a plurality of metal plates by applying a laser beam scanned by a scanning unit to the plurality of metal plates while moving the scanning unit scanning the laser beam, the laser beam being guided from a laser oscillator, the plurality of metal plates being an object to be welded, the laser welding method including: performing a step of preliminary-fixation-welding on a predetermined place in a welding direction of the object to be welded and a step of main-welding on a place corresponding to the preliminarily-fixed place of the object to be welded within a scanning range of the scanning unit while moving the scanning unit, in which when the place corresponding to the preliminarily-fixed place of the object to be welded is main-welded, the place is main-welded in a state where the place to be main-welded is located between a place that is already main-welded on an upstream side with respect to the place to be main-welded in the welding direction and a place that is already preliminary-fixation-welded on a downstream side with respect to the place to be main-welded in the welding direction.

In the laser welding method according to the present disclosure, the preliminary-fixation welding step and the main welding step for the object to be welded are performed within the scanning range of the scanning unit while moving the scanning unit. That is, both the preliminary-fixation welding and the main welding are performed in the same process. Therefore, the number of times of traveling of the scanning unit (that is, the number of times the scanning unit travels on the welding route) that are necessary when the object to be welded is welded can be reduced to one. Consequently, the number of steps necessary for welding the object to be welded can be reduced. Further, when the object to be welded is welded, the place to be main-welded is main-welded in the state where the place to be main-welded is located between a place that is already main-welded and a place that is already preliminary-fixation-welded (in other words, in a state where both side of the place to be main-welded are restrained). Therefore, the deformation of the object to be welded can be prevented or reduced and hence the occurrence of defective welding can be prevented.

Further, in the laser welding method according to the present disclosure, two or more places located on the downstream side with respect to the place to be main-welded in the welding direction may be preliminary-fixation-welded. By preliminary-fixation-welding two or more places located on the downstream side with respect to the place to be main-welded in the welding direction as described above, the deformation and the positional deviation can be prevented more reliably.

Further, in the laser welding method according to the present disclosure, the place to be main-welded may be main-welded so that the place to be main-welded overlaps the place to be preliminary-fixation-welded. By main-welding the place to be main-welded so that the place to be main-welded overlaps the place to be preliminary-fixation-welded as described above, it is possible to prevent various external inputs for the objects to be welded from directly entering the preliminary-fixation-welded place and hence prevent the cause of secondary defects that would otherwise be caused by the rupture of the preliminary-fixation-welded place.

Further, in the laser welding method according to the present disclosure, the place to be main-welded may be main-welded so that the place to be main-welded is shifted from the preliminary-fixation-welded place in at least one of a direction in parallel with the welding direction and a direction perpendicular to the welding direction. By shifting the place to be main-welded from the preliminary-fixation-welded place as described above, the objects to be welded can be restrained at a place closer to the place to be main-welded when the place to be main-welded is main-welded, and hence the effect for preventing or reducing the deformation of the object to be welded can be improved.

Further, in the laser welding method according to the present disclosure, when the place to be main-welded is main-welded, the place to be main-welded may be welded in a linear shape. By welding the place to be main-welded in a linear shape as described above, the objects to be welded can be firmly welded.

According to the present disclosure, it is possible to provide a laser welding method capable of reducing the number of steps necessary for welding an object to be welded while preventing the occurrence of defective welding.

The above and other objects, features and advantages of the embodiments disclosed herein will become more fully understood from the detailed description given hereinbelow and the accompanying drawings which are given by way of illustration only, and thus are not to be considered as limiting the present disclosure.

DESCRIPTION OF THE EXEMPLARY EMBODIMENTS

Exemplary embodiments according to the present disclosure are explained hereinafter with reference to the drawings.

Figure 1:
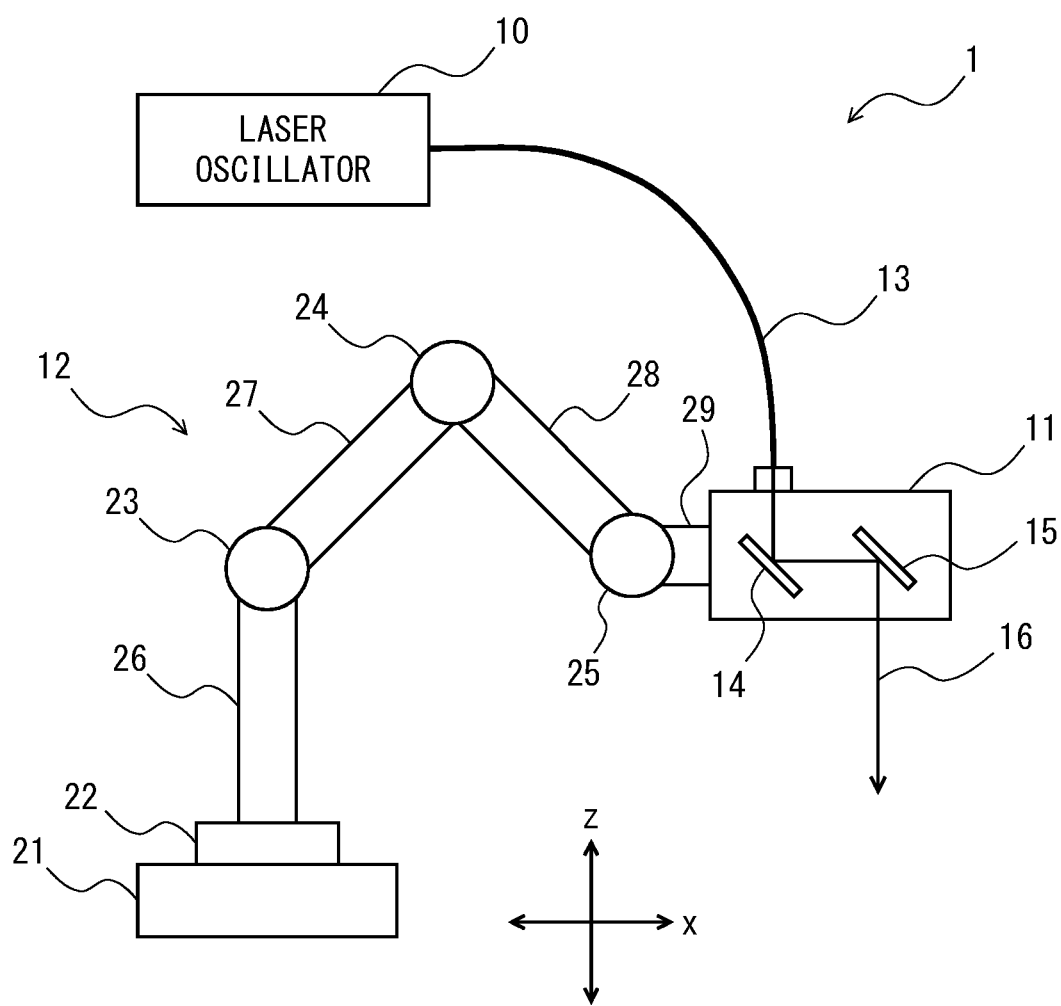
FIG. 1 shows an exemplary laser welding device for carrying out a laser welding method according to an exemplary embodiment.

FIG. 1 shows an example of a laser welding device for carrying out a laser welding method according to an exemplary embodiment. As shown in FIG. 1, a laser welding device 1 includes a laser oscillator 10, a scanning unit 11, and a robot 12.

The laser oscillator 10 generates a laser beam. The generated laser beam is guided to the scanning unit 11 by using an optical fiber cable 13. For the laser beam, for example, a carbon dioxide gas laser, a YAG laser, a fiber laser, or the like can be used.

The scanning unit 11 scans the laser beam (i.e., directs the laser beam in various directions in an orderly manner (hereinafter simply expressed as "scans the laser beam")), which is guided by using the optical fiber cable 13, within a scanning range 18 (see the top view shown in FIG. 2). The scanned laser beam 16 is applied to an object to be welded 31. The scanning unit 11 includes mirrors 14 and 15. Each of the mirrors 14 and 15 is configured so as to be able to rotate about at least one rotation axis. For example, the mirror 14 scans the laser beam 16 (i.e., directs the laser beam 16 at various angles) in the x-axis direction and the mirror 15 scans the laser beam 16 (i.e., directs the laser beam 16 at various angles) in the y-axis direction (see the top view shown in FIG. 2). For example, each of the mirrors 14 and 15 can be formed by using a galvano-mirror. Note that although FIG. 1 shows a case where the scanning unit 11 is formed by using two mirrors 14 and 15, the scanning unit 11 may be formed by using one mirror that can be rotate about two axis directions.

The robot 12 is configured so as to be able to move the scanning unit 11. For example, the robot 12 can be formed by using a jointed-arm robot. The robot 12 shown in FIG. 1 includes a pedestal 21, a rotation mechanism 22, joints 23, 24 and 25, and arm sections 26, 27, 28 and 29. The rotation mechanism 22 is configured so as to be able to rotate the arm 26. The joint 23 connects the arm section 26 with the arm section 27 in a rotatable manner. The joint 24 connects the arm section 27 with the arm section 28 in a rotatable manner. The joint 25 connects the arm section 28 with the arm section 29 in a rotatable manner. With the above-described configuration, the robot 12 can move the scanning unit 11 in arbitrary directions (x-axis direction, y-axis direction, and z-axis direction).

Next, a fundamental operation of the laser welding device 1 is explained with reference to the top view shown in FIG. 2 and the cross section views shown in FIGS. 3(a)-(d). FIGS. 2 and 3 show an example where two metal plates 31 and 32, which are objects to be welded, are welded and joined together. Note that although FIG. 3 shows a case where two metal plates 31 and 32, which are the objects to be welded, are disposed so that they are apart from each other with a small gap therebetween, the two metal plates 31 and 32 may be disposed so that they are in contact with each other.

Figure 2:
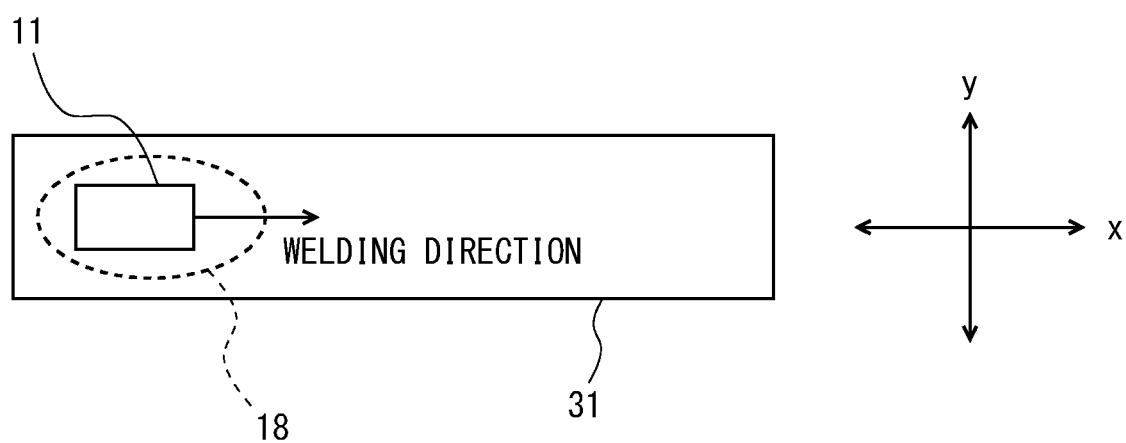
FIG. 2 shows a top view of a scanning unit of the laser welding device shown in FIG. 1 performing a fundamental operation of the laser welding device.
Figure 3:
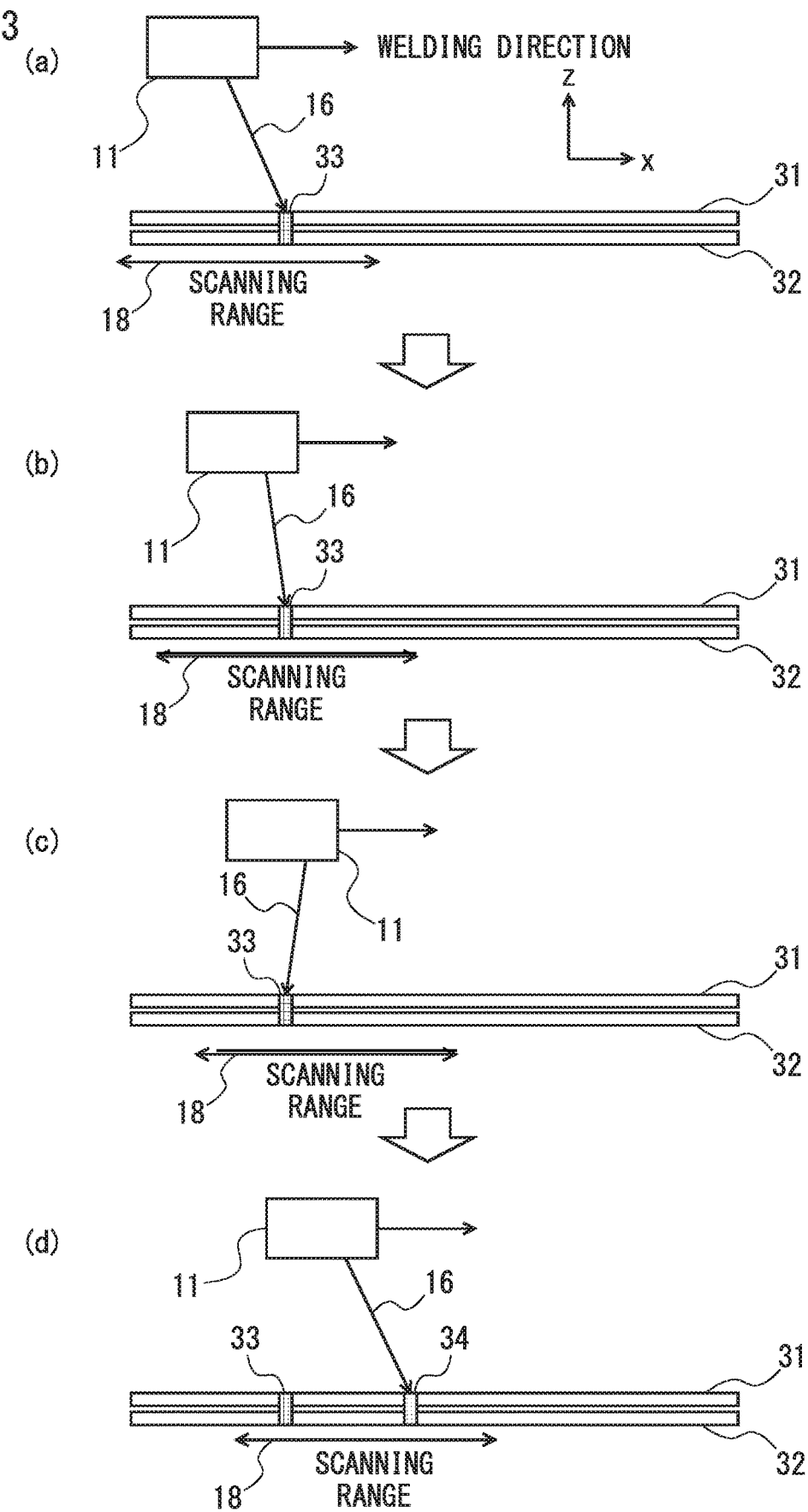
FIGS. 3(a)-(d) show cross section views of the scanning unit of FIG. 2 performing the fundamental operation of FIG. 2.

As shown in the top view in FIG. 2, when the objects to be welded 31 are welded, the robot 12 (not shown in FIG. 2) moves the scanning unit 11 in a welding direction. Note that the welding direction is a direction along which the metal plates 31 and 32 are welded. In other words, it is a direction along which welded parts 33 and 34 are formed. It should be noted that the scanning range 18 of the laser beam 16 is moved as the scanning unit 11 moves. Note that the robot 12 may move the scanning unit 11 in the welding direction at a constant speed (i.e., continuously move the scanning unit 11). Alternatively, the robot 12 may move the scanning unit 11 in a stepwise manner (i.e., discontinuously move the scanning unit 11).

Further, as shown in FIG. 3(a), when the metal plates 31 and 32 are welded together, the scanning unit 11 applies the laser beam 16 to a welding part 33. Since the scanning unit 11 is continuously moving in the welding direction, the scanning unit 11 scans the laser beam 16 so that the laser beam 16 is applied to the welding part 33 as shown in FIGS. 3(b) and 3(c). Note that the moving speed of the scanning unit 11, i.e., the speed at which the robot 12 moves the scanning unit 11 is adjusted to such a speed that the welding part 33 remains within the scanning range 18 during the period from when the welding of the welding part 33 is started to when the welding is completed.

After that, as shown in FIG. 3(d), the scanning unit 11 applies the laser beam 16 to a next welding part 34. By the above-described operation, the laser welding device 1 can weld predetermined places of the metal plates 31 and 32 by scanning the laser beam 16 by using the scanning unit 11 while moving the scanning unit 11 by using the robot 12. When the above-described welding method is used, the welded parts 33 and 34 are formed as discrete welded parts.

Figure 4:
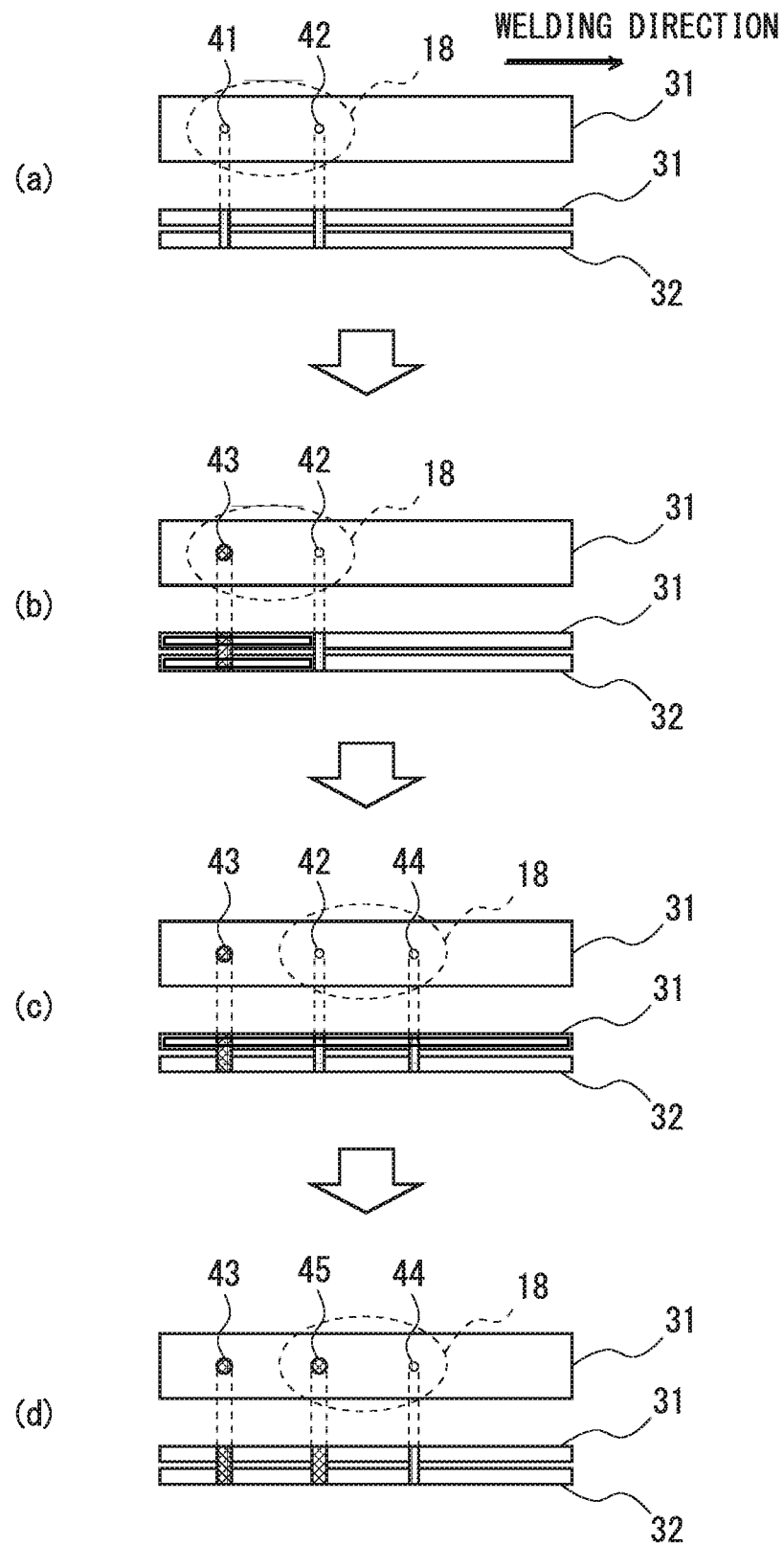
FIGS. 4(a)-(d) show diagrams for explaining a laser welding method according to an exemplary embodiment.

Next, a laser welding method according to this exemplary embodiment is explained with reference to FIGS. 4(a)-(d). The laser welding method according to this exemplary embodiment can be carried out by using the laser welding device 1 explained above. In each of FIGS. 4(a) to 4(d), the upper part is a top view and the lower part is a cross section. Further, although FIG. 4 shows a case where two metal plates 31 and 32, which are the objects to be welded, are disposed so that they are apart from each other with a small gap therebetween, the two metal plates 31 and 32 may be disposed so that they are in contact with each other. Further, the number of metal plates, which are objects to be welded, may be three or more. Note that in FIG. 4, only the scanning range 18 of the scanning unit 11 is shown and the illustration of the scanning unit 11 itself is omitted.

The laser welding method according to this exemplary embodiment is a laser welding method for welding a plurality of metal plates 31 and 32, which are objects to be welded, by applying a laser beam 16 that is guided from the laser oscillator 10 and scanned by the scanning unit 11 to the plurality of metal plates 31 and 32 while moving the scanning unit 11 scanning the laser beam 16.

As shown in FIG. 4(a), the scanning unit 11 applies the laser beam 16 to a welding part 41, thereby preliminary-fixation-welding the welding part 41. Note that the preliminary-fixation welding is preliminary welding for preventing positional deviation between the metal plates 31 and 32 (i.e., welding having a joint strength weaker than that of the main welding). Next, the scanning unit 11 applies the laser beam 16 to a welding part 42, thereby preliminary-fixation-welding the welding part 42. After that, as shown in FIG. 4(b), the scanning unit 11 applies the laser beam 16 to a welding part 43 (i.e., a place corresponding to the preliminary-fixation-welded part 41) and thereby main-welds the welding part 43. Note that the main welding is welding for firmly joining the metal plates 31 and 32 to each other. For example, the application time (i.e., emitting time) of the laser beam 16 in the main welding is longer than that in the preliminary-fixation welding. Further, in this specification, the "place corresponding to the preliminary-fixation-welded part" means the "preliminary-fixation-welded place and its vicinity."

It should be noted that the left ends of the metal plates 31 and 32 in the drawings (i.e., the welding start positions of the metal plates 31 and 32) are restrained by a clamp (not shown). Therefore, when the welding part 43 is main-welded, the welding part 43 can be main-welded in a state where both ends of the welding part 43 are restrained, i.e., in a state where the upstream side of the welding part 43 in the welding direction is restrained by the clamp and the downstream side of the welding part 43 in the welding direction is restrained by the preliminary-fixation-welded part 42. Therefore, it is possible to prevent the metal plates 31 and 32 from being deformed and prevent their positions from being deviated from each other when the welding part 43 is main-welded. Note that since the welding part 41 shown in FIG. 4(a) is the welding starting point, the preliminary-fixation welding of the welding part 41 can be omitted.

Next, as shown in FIG. 4(c), the scanning unit 11 applies the laser beam 16 to a welding part 44, thereby preliminary-fixation-welding the welding part 44. After that, as shown in FIG. 4(d), the scanning unit 11 applies the laser beam 16 to a welding part 45 (i.e., a place corresponding to the preliminary-fixation-welded part 42) and thereby main-welds the welding part 45. That is, at the timing shown in FIG. 4(c), instead of main-welding the welding part 42, the scanning unit 11 preliminary-fixation-welds the welding part 44 located on the welding direction downstream side with respect to the welding part 42. Therefore, when the welding part 45 is main-welded at the timing shown in FIG. 4(d), the welding part 45 can be main-welded in a state where both sides of the welding part 45 are restrained. That is, the welding part 45 can be main-welded in a state where the upstream side of the welding part 45 in the welding direction is restrained by the welded part 43, which has already been main-welded, and the downstream side of the welding part 45 in the welding direction is restrained by the preliminary-fixation-welded part 42. Therefore, it is possible to prevent the metal plates 31 and 32 from being deformed and prevent their positions from being deviated from each other when the welding part 45 is main-welded.

After that, by repeating similar operations, the metal plates 31 and 32 can be welded together. Further, the preliminary-fixation welding of the welding finishing point can be omitted as in the case of the above-described welding starting point, though it is not explained here by using drawings.

As explained in the "Summary" section, during remote welding in which an object to be welded is welded by applying a laser beam scanned by a scanning unit to the object to be welded, when the object to be welded (such as the body of an automobile) is larger than the scanning range of the laser beam, the entire range of the object to be welded cannot be welded just by scanning the laser beam by the scanning unit. In such a case, it is necessary to perform welding while moving the scanning unit by using a robot.

Incidentally, when the object to be welded is a plurality of metal plates, there are cases where the objects to be welded are deformed by a thermal distortion, a residual stress, or the like that occurs when the objects to be welded are welded, thus causing defective welding. To prevent the occurrence of such defective welding, it is necessary to perform preliminary-fixation welding before the main welding.

Figure 11:
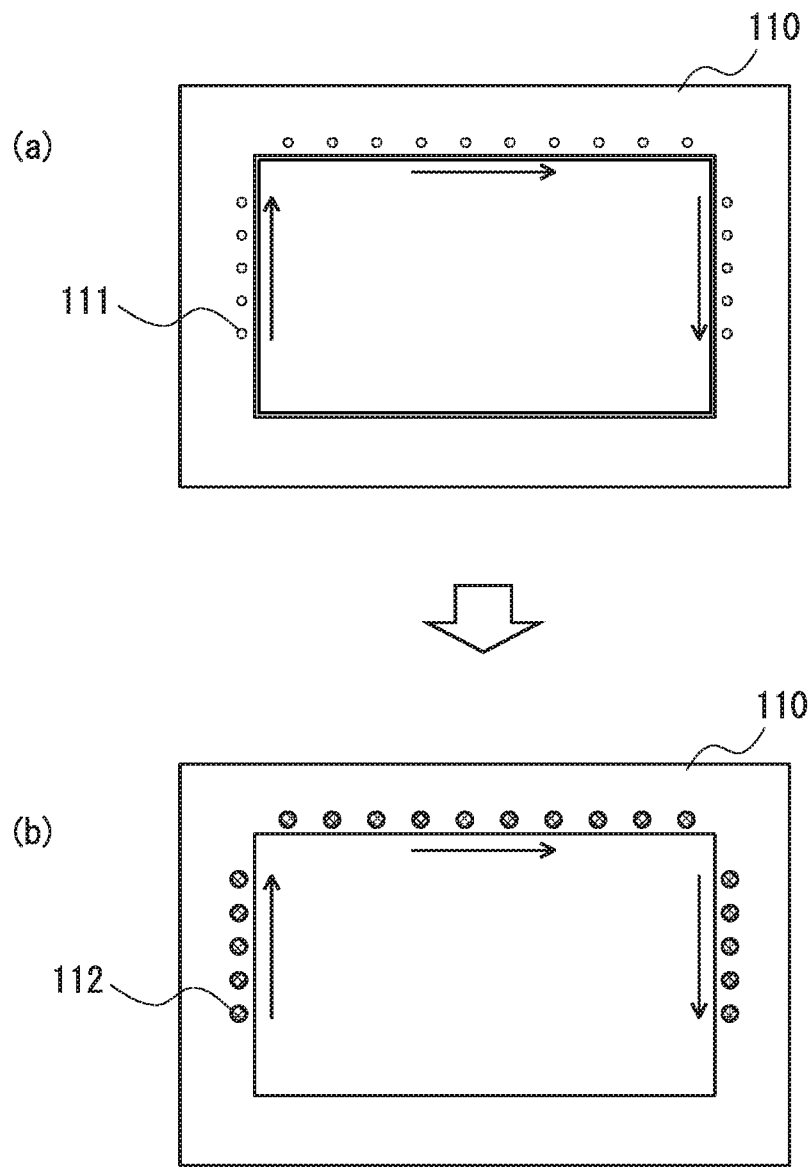
FIGS. 11(a)-(b) show diagrams for explaining a comparative exemplary laser welding method.

However, in the case where the main welding is performed for the objects to be welded after performing the preliminary-fixation welding, it is necessary to perform the preliminary-fixation welding while moving the scanning unit by using the robot (see FIG. 11(a)), and then perform the main welding while moving the scanning unit by using the robot again (see FIG. 11(b)). That is, in this case, the scanning unit needs to be moved on the same welding route twice in total. Further, the moving operation of the scanning unit performed by the robot is slower than the scanning operation of the laser beam performed by the scanning unit. Therefore, since the scanning unit moves on the same route twice in total when the objects to be welded are welded, the number of steps necessary for the welding increases.

To decrease the number of steps necessary for welding, in the laser welding method according to the present disclosure, the preliminary-fixation welding step and the main welding step for the object to be welded are performed within the scanning range 18 of the scanning unit 11 while moving the scanning unit 11. That is, both the preliminary-fixation welding and the main welding are performed in the same process. Therefore, the number of moving operations of the scanning unit 11 (that is, the number of times the scanning unit 11 travels on the welding route) that are necessary when the metal plates 31 and 32 are welded can be reduced to one. Consequently, the number of steps necessary for welding the object to be welded can be reduced. Further, as shown in FIG. 4(d), when the metal plates 31 and 32 are welded, the part 45 to be main-welded is main-welded in the state where the part 45 is located between the part 43, which has already been main-welded, and the part 44, which has already been preliminary-fixation-welded, (in other words, in a state where both sides of the part 45 to be main-welded are restrained). Therefore, the deformation of the metal plates 31 and 32 can be prevented or reduced and hence the occurrence of defective welding can be prevented.

According to the present disclosure in accordance with the exemplary embodiment explained above, it is possible to provide a laser welding method capable of reducing the number of steps necessary for welding an object to be welded while preventing the occurrence of defective welding.

Note that in the laser welding method according to the present disclosure, two or more places located on the downstream side with respect to the place to be main-welded in the welding direction may be preliminary-fixation-welded. A case where an object to be welded is welded in a state where two or more places located on the downstream side in the welding direction are preliminary-fixation-welded is explained hereinafter with reference to FIGS. 5(a)-(d).

Figure 5:
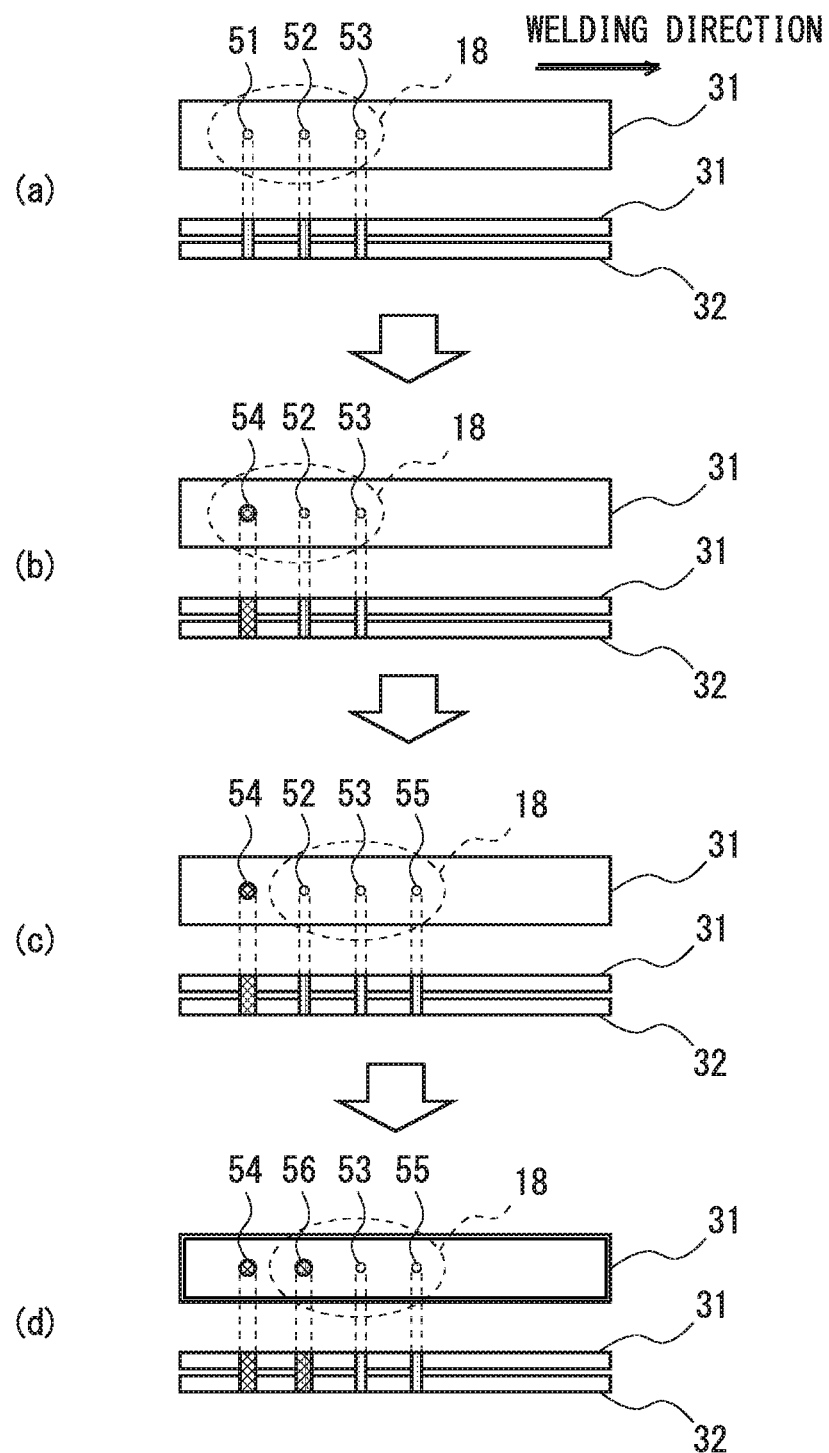
FIGS. 5(a)-(d) show diagrams for explaining another laser welding method according to another exemplary embodiment.

As shown in FIG. 5(a), the scanning unit 11 applies the laser beam 16 to each of welding parts 51, 52 and 53, thereby preliminary-fixation-welding the welding parts 51, 52 and 53. Note that the welding parts 51, 52 and 53 may be preliminary-fixation-welded in the order of the welding parts 51, 52 and 53, or may be preliminary-fixation-welded in other arbitrary orders.

Next, as shown in FIG. 5(b), the scanning unit 11 applies the laser beam 16 to a welding part 54 (i.e., a place corresponding to the preliminary-fixation-welded part 51) and thereby main-welds the welding part 54. It should be noted that the left ends of the metal plates 31 and 32 in the drawings (i.e., the welding start positions of the metal plates 31 and 32) are restrained by a clamp (not shown) as in the case of the above-described example. Therefore, when the welding part 54 is main-welded, the welding part 54 can be main-welded in a state where both ends of the welding part 54 are restrained, i.e., in a state where the upstream side of the welding part 54 in the welding direction is restrained by the clamp and the downstream side of the welding part 54 in the welding direction is restrained at two places, i.e., the two preliminary-fixation-welded parts 52 and 53. Therefore, it is possible to prevent the metal plates 31 and 32 from being deformed and prevent their positions from being deviated from each other when the welding part 54 is main-welded. Note that since the welding part 51 shown in FIG. 5(a) is the welding starting point, the preliminary-fixation welding of the welding part 51 can be omitted.

Next, as shown in FIG. 5(c), the scanning unit 11 applies the laser beam 16 to a welding part 55, thereby preliminary-fixation-welding a welding part 55. After that, as shown in FIG. 5(d), the scanning unit 11 applies the laser beam 16 to a welding part 56 (i.e., a place corresponding to the preliminary-fixation-welded part 52) and thereby main-welds the welding part 56. When the welding part 56 is main-welded, the welding part 56 can be main-welded in a state where both sides of the welding part 56 are restrained. That is, when the welding part 56 is main-welded, the welding part 56 can be main-welded in a state where the upstream side of the welding part 56 in the welding direction is restrained by the welded part 54, which has already been main-welded, and the downstream side of the welding part 56 in the welding direction is restrained at two places, i.e., the two preliminary-fixation-welded parts 53 and 55. Therefore, it is possible to prevent the metal plates 31 and 32 from being deformed and prevent their positions from deviating from each other when the welding part 56 is main-welded.

After that, by repeating similar operations, the metal plates 31 and 32 can be welded together. Further, the preliminary-fixation welding of the welding finishing point can be omitted as in the case of the above-described welding starting point, though it is not explained here by using drawings. In the laser welding method shown in FIGS. 5(a)-(d), since two places located on the downstream side with respect to the place to be main-welded in the welding direction are preliminary-fixation-welded, the deformation and the positional deviation of the metal plates 31 and 32 can be prevented more reliably than by the laser welding method shown in FIGS. 4(a)-(d). Note that although FIGS. 5(a)-(d) show an example of a laser welding method in which two places located on the downstream side with respect to the places to be main-welded in the welding direction are preliminary-fixation-welded, the number of the preliminary-fixation-welded places may be three or more. In consideration of the number of steps for the laser welding, the number of preliminary-fixation-welded places is preferably about six at the maximum.

Each of FIGS. 4(a)-(d) and 5(a)-(d) shows an example of a laser welding method in which the main-welding is performed so that the main-welded place overlaps the preliminary-fixation-welded place. For example, as shown in FIGS. 4(c) and 4(d), the welding part 45 is main-welded by applying the laser beam 16 to the preliminary-fixation-welded place 42. By main-welding the place to be main-welded so that the place to be main-welded overlaps the place to be preliminary-fixation-welded as shown above, it is possible to prevent various external inputs for the objects to be welded from directly entering the preliminary-fixation-welded place and hence prevent the cause of secondary defects that would otherwise be caused by the rupture of the preliminary-fixation-welded place. Note that in the laser welding method according to this exemplary embodiment, the place to be main-welded may be main-welded so that the place to be main-welded is shifted from the preliminary-fixation-welded place in at least one of a direction in parallel with the welding direction and a direction perpendicular to the welding direction.

Figure 6:
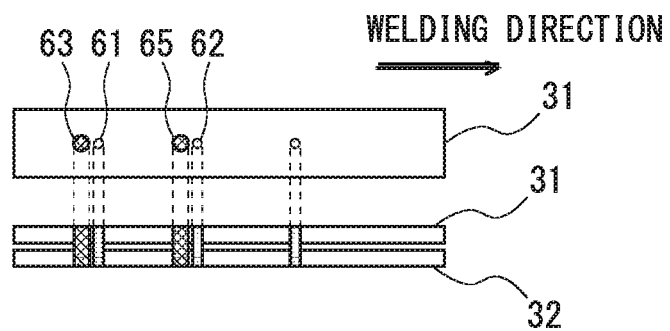
FIG. 6 is a diagram for explaining another laser welding method according to another exemplary embodiment.

For example, as shown in FIG. 6, main-welded places 63 and 65 may be disposed so that they are shifted from preliminary-fixation-welded places 61 and 62, respectively, in a direction in parallel with the welding direction. Note that FIG. 6 shows a case where the main-welded places 63 and 65 are shifted from the preliminary-fixation-welded places 61 and 62, respectively, to the upstream side. However, in this exemplary embodiment, the main-welded places 63 and 65 may be shifted from the preliminary-fixation-welded places 61 and 62, respectively, to the downstream side.

Figure 7:
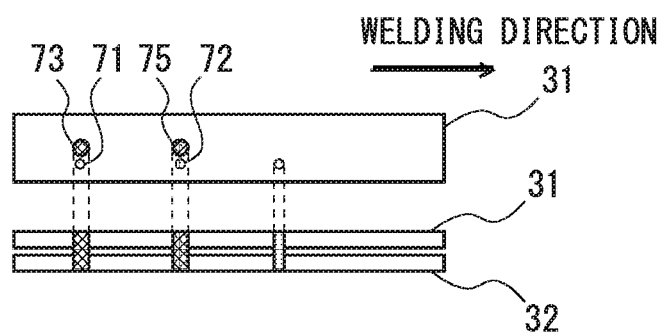
FIG. 7 is a diagram for explaining another laser welding method according to another exemplary embodiment.

Further, as shown in FIG. 7, for example, main-welded places 73 and 75 may be disposed so that they are shifted from preliminary-fixation-welded places 71 and 72, respectively, in a direction perpendicular to the welding direction. Note that FIG. 7 shows a case where the main-welded places 73 and 75 are shifted from the preliminary-fixation-welded places 71 and 72, respectively, upwardly in the drawing. However, in this exemplary embodiment, the main-welded places 73 and 75 may be shifted from the preliminary-fixation-welded places 71 and 72, respectively, downwardly in the drawing.

Further, in the laser welding method according to this exemplary embodiment, the main-welding may be performed so that main-welded places are shifted from their respective preliminary-fixation-welded places in an oblique direction, i.e., in both the direction in parallel with the welding direction and the direction perpendicular to the welding direction.

By shifting the place to be main-welded from the preliminary-fixation-welded place as explained above, the objects to be welded can be restrained at a place closer to the place to be main-welded when the place to be main-welded is main-welded, and hence the effect for preventing or reducing the deformation of the object to be welded can be improved.

Figure 8:
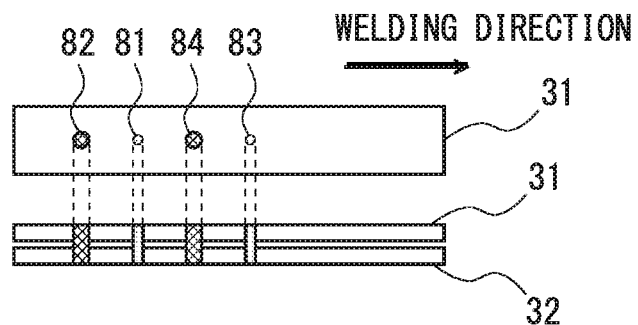
FIG. 8 is a diagram for explaining another laser welding method according to another exemplary embodiment.

Further, in the laser welding method according to this exemplary embodiment, all the places corresponding to the preliminary-fixation-welded places do not necessarily have to be main-welded. For example, as shown in FIG. 8, every other one of the places corresponding to the preliminary-fixation-welded places may be main-welded. In FIG. 8, the welded places 81 and 83 are places where only preliminary-fixation welding is performed and the welded places 82 and 84 are places where main-welding is preformed after preliminary-fixation welding is performed.

Further, in the laser welding method according to this exemplary embodiment, as shown in FIGS. 9(a)-(c), when main-welding is performed, it may be performed in a linear shape (the place welded in a linear shape is represented by a reference number "93"). Even in this case, as shown in FIG. 9(a), the scanning unit 11 applies the laser beam 16 to welding parts 91 and 92 and thereby preliminary-fixation-welding the welding parts 91 and 92. After that, as shown in FIG. 9(b), the scanning unit 11 main-welds the preliminary-fixation-welded place 91. Note that the scanning unit 11 welds the metal plates 31 and 32 together in a linear shape. Then, after the welded place 93 reaches the preliminary-fixation-welded place 91, a welding place 94 is preliminary-fixation-welded before the welded place 93 reaches the preliminary-fixation-welded 92.

Figure 9:
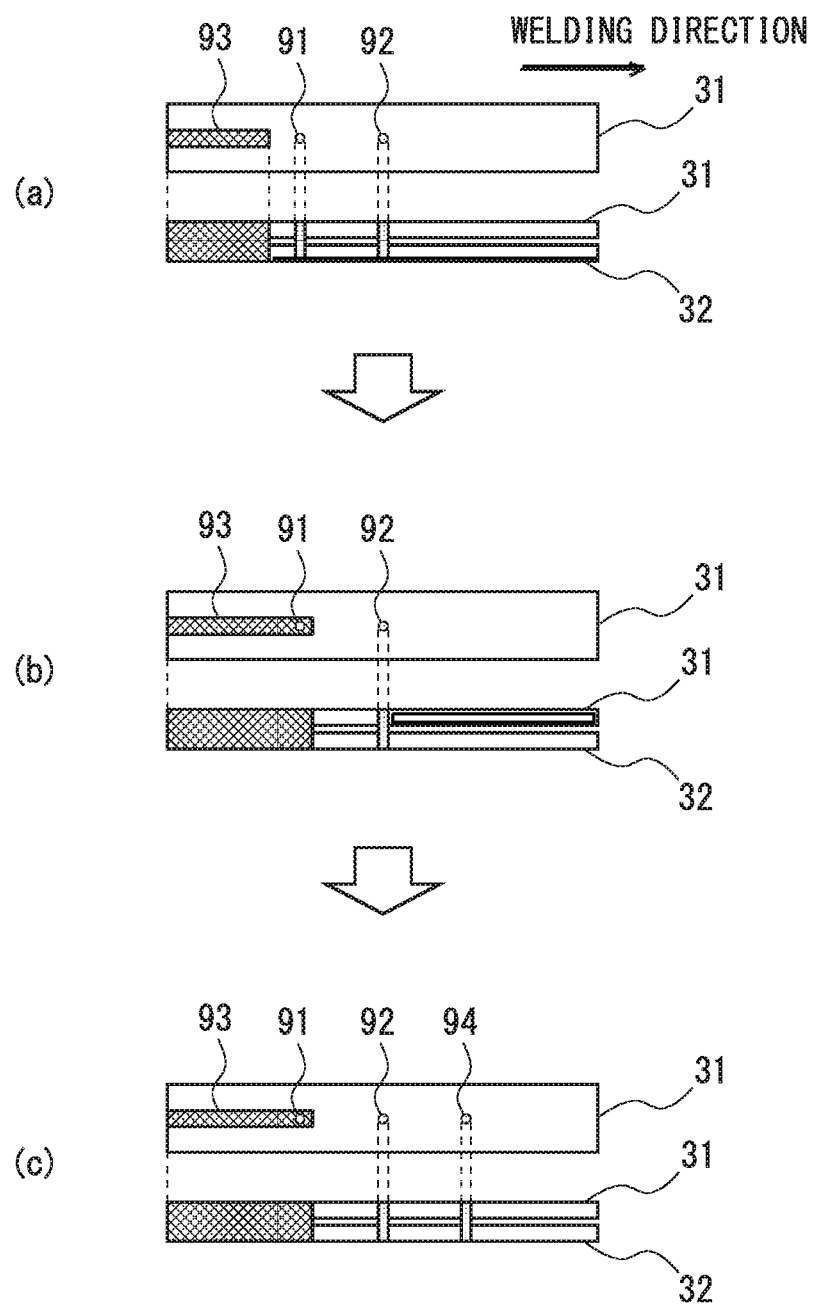
FIG. 9(a)-(c) show diagrams for explaining another laser welding method according to another exemplary embodiment.

Even in this case, by performing preliminary-fixation welding on the welding direction downstream side before performing the main welding, the main welding can be performed in a state where both sides of the welding place are restrained. Therefore, the deformation and the positional deviation of the metal plates 31 and 32 can be prevented when the welding places are main-welded. Further, as shown in FIG. 9, by welding the place to be main-welded in a linear shape, the metal plates 31 and 32 can be welded together more firmly than the case where the places to be main-welded are welded in a spot shape as shown in FIG. 4.

Note that the robot 12 moves the scanning unit 11 of the laser welding device 1 shown in FIG. 1. However, this exemplary embodiment may be configured so that the robot 12 moves both the scanning unit 11 and the laser oscillator 10, provided that the laser oscillator 10 can be reduced in size.

Further, the nugget shape of a welded place can be any arbitrary shape in the laser welding method according to this exemplary embodiment. For example, the nugget shape may be a C-shape, an O-shape, a linear shape, or the like. Further, the laser welding method according to this exemplary embodiment can be carried out by using laser/arc hybrid welding, electron beam welding, or the like. Further, preliminary-fixation welding and main welding may be performed by using a plurality of scanning units (i.e., a plurality of laser beams). In such a case, since a plurality of laser beams are used, the welding speed can be increased.

According to the present disclosure in accordance with the exemplary embodiment explained above, it is possible to provide a laser welding method capable of reducing the number of steps necessary for welding an object to be welded while preventing the occurrence of defective welding.

EXAMPLES

Next, examples according to the present disclosure are explained.

An object to be welded was welded by using a laser welding method explained above. In this example, two 6000-series aluminum alloy plates placed on each other were used as an object to be welded 100 (see FIG. 10). The thicknesses of the aluminum alloy plates were 1.2 mm and 0.9 mm, respectively. A fiber laser was used as the laser oscillator 10 of the laser welding device 1. The shape of each preliminary-fixation-welded place was a spot shape having a diameter of about 2 mm. Further, the shape of each main-welded place was a spot shape having a diameter of about 7 mm. The speed of the preliminary-fixation welding (i.e., the speed at which a spot shape of preliminary-fixation welding was formed) was about 0.1 seconds. Further, the speed of the main welding (i.e., the speed at which a spot shape of main welding was formed) was about 1.0 seconds.

Figure 10:
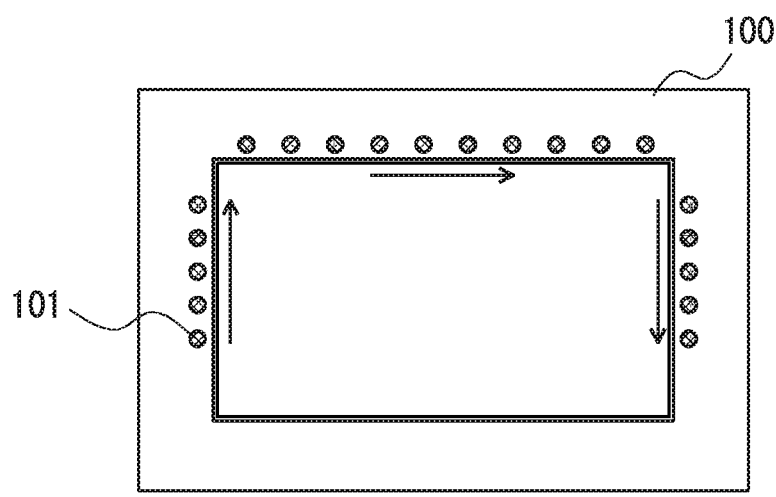
FIG. 10 is a diagram for explaining an exemplary laser welding method.

In this example, as shown in FIG. 10, 20 places in the object to be welded 100 were welded (welded places are represented by a reference number "101"). Note that by using the laser welding method explained above, preliminary-fixation welding and main welding of the object to be welded 100 were performed within the scanning range of the scanning unit while moving the scanning unit. That is, in the example shown in FIG. 10, the number of times of the traveling of the scanning unit (that is, the number of times the scanning unit travels on the welding route) when the object to be welded 100 was welded was one. Note that the moving speed of the scanning unit was 0.09 m/s and its traveling distance was about 2 m. Further, the time taken for welding (preliminary-fixation welding and main welding) all the welding places (20 places) was 22 seconds. That is, it took 1.1 second for welding (preliminary-fixation welding and main welding) one place.

Further, as a comparative example, after an object to be welded 110 was preliminary-fixation-welded while moving the scanning unit (preliminary-fixation-welded places are represented by a reference number "111") as shown in FIG. 11(a), the object to be welded 110 was main welded while moving the scanning unit (main-welded places are represented by a reference number "112") as shown in FIG. 11(b). For the preliminary-fixation welding shown in FIG. 11(a), it took 0.1 seconds for preliminary-fixation-welding one place and hence it took 2 seconds (0.1 seconds×20 places) in total.

Note that when the moving speed of the scanning unit was raised to 1 m/s, the scanning unit could not be accurately moved. Therefore, the moving speed of the scanning unit was reduced. As a result, in the preliminary-fixation welding step, the time for welding that was performed while the scanning unit was moving was reduced and hence the processing efficiency was lowered. Further, for the main welding shown in FIG. 11(b), it took 1 second for main welding one place and hence it took 20 seconds (1 second ×20 places) in total.

When the example is compared with the comparative example, since the scanning unit needs to travel on the same welding route twice in total in the comparative example, the number of steps necessary for the welding increases in the comparative example. That is, although the time necessary for the welding itself (which corresponds to the time during which the laser beam was applied to the object to be welded) in the example was substantially equal to that in the comparative example, the overall time of the welding process including the traveling of the scanning unit was increased in the comparative example because the scanning unit needed to travel on the same welding route twice in total in the comparative example. Further, in the preliminary-fixation welding in the comparative example, the time during which welding was performed while the scanning unit was moving was reduced and hence the processing efficiency was lowered.

In contrast to this, in the example, the preliminary-fixation welding step and the main welding step were performed within the scanning range of the scanning unit while moving the scanning unit. That is, both the preliminary-fixation welding and the main welding were performed in the same process. Therefore, the number of moving operations of the scanning unit (that is, the number of times the scanning unit travels on the welding route) when the object to be welded 100 was welded could be reduced to one. Consequently, the number of steps necessary for welding the object to be welded can be reduced. Further, in the example, the welding (preliminary-fixation welding and main welding) was performed during almost the entire period in which the scanning unit was moving. Therefore, the welding process could be performed in a concentrated fashion and hence the processing efficiency could be improved.

In the welding method explained above, example cases where an object to be welded, which is two plates placed on each other, is lap-welded are explained. However, the embodiments described herein can be applied to any type of welding where two or more joints (objects to be welded) are welded, such as butt-welding and fillet-welding.

From the embodiments thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A laser welding method for welding a plurality of metal plates by applying a laser beam scanned by a scanning unit to the metal plates, the laser welding method comprising the steps of:
    moving the scanning unit in a welding direction along a welding path,
    preliminary-fixation-welding a plurality of predetermined places along the welding path and within a scanning range of the scanning unit, and
    main-welding a place associated with at least one of the preliminarily-fixed places along the welding path and within a scanning range of the scanning unit,
    wherein the steps of preliminary-fixation-welding and main-welding are performed with one travel of the scanning unit along the welding path,
    the preliminary-fixation-welding has a joint strength weaker than that of the main welding,
    the main-welded place has a spot shape,
    each of the preliminary-fixed places has a spot shape, and
    a place is main-welded in a spot shape in a state where the place to be main-welded is located between a spot that is already main-welded on an upstream side with respect to the place to be main-welded in the welding direction and a preliminary-fixed spot that is already preliminary-fixation-welded on a downstream side with respect to the place to be main-welded in the welding direction.

2. The laser welding method according to claim 1, wherein the step of moving the scanning unit along the welding path is performed at a constant speed.

3. The laser welding method according to claim 1, wherein the place to be main-welded is offset from the one or more associated preliminarily-fixed places.

4. The laser welding method according to claim 1, wherein, by performing the preliminary-fixation-welding and main welding during the one travel, the preliminary-fixation-welding and the main welding are performed in the same process.

5. The laser welding method according to claim 1, wherein a plurality of places to be preliminary-fixation-welded and a plurality of places to be main-welded are lined along the welding direction, and the plurality of main-welded places having the spot shape are discretely formed non-continuous welds along the welding direction.

6. The laser welding method according to claim 1, further comprising the step of:
    repeating the preliminary-fixation welding and main welding during the one travel movement of the scanning unit along the welding path.

7. The laser welding method according to claim 1, wherein during the moving of the scanning unit in the welding direction along the welding path, the scanning unit moves away from an initial location with respect to the plurality of metal plates, to another location with respect to the plurality of metal plates, in a direction along the welding path.

* * * * *